United States Patent
Neichev

(10) Patent No.: US 8,234,643 B2
(45) Date of Patent: Jul. 31, 2012

(54) CRON TIME PROCESSING IMPLEMENTATION FOR SCHEDULING TASKS WITHIN A MULTI-TIERED ENTERPRISE NETWORK

(75) Inventor: Nikolai W. Neichev, Sofin (BG)

(73) Assignee: SAP AG, Walldorf (DE)

( * ) Notice: Subject to any disclaimer, the term of this patent is extended or adjusted under 35 U.S.C. 154(b) by 1382 days.

(21) Appl. No.: 11/638,823

(22) Filed: Dec. 13, 2006

(65) Prior Publication Data

US 2008/0148264 A1    Jun. 19, 2008

(51) Int. Cl.
*G06F 9/46* (2006.01)
(52) U.S. Cl. .......................................... 718/102; 718/100
(58) Field of Classification Search .................. None
See application file for complete search history.

(56) References Cited

U.S. PATENT DOCUMENTS

| | | | |
|---|---|---|---|
| 5,902,352 A * | 5/1999 | Chou et al. .................. | 718/102 |
| 6,032,172 A * | 2/2000 | Kutcher ...................... | 718/102 |
| 6,438,573 B1 * | 8/2002 | Nilsen ......................... | 718/100 |
| 6,584,587 B1 * | 6/2003 | McDermott ................. | 714/55 |
| 7,076,781 B2 * | 7/2006 | Skovira ....................... | 718/102 |
| 7,412,532 B2 * | 8/2008 | Gondhalekar et al. ...... | 709/231 |
| 7,457,973 B2 * | 11/2008 | Liu .............................. | 713/310 |
| 2007/0050771 A1 * | 3/2007 | Howland et al. ............ | 718/102 |

* cited by examiner

*Primary Examiner* — Meng An
*Assistant Examiner* — Tammy Lee
(74) *Attorney, Agent, or Firm* — Schwegman, Lundberg & Woessner, P.A.

(57) ABSTRACT

A computer implemented system and method for scheduling jobs. A method according to one embodiment includes the operations of: determining a first possible execution time of a job from a data object containing a job timing entry; determining if a specified base time is less than a first possible execution time of the job; if the specified base time is less than the first possible execution time, then subtracting the base time from the first possible execution time to determine the time until the next execution of the job; and if the specified base time is greater than the first possible execution time, then searching for a next execution time which is greater then the specified base time and subtracting the base time from the next execution time to determine the time until the next execution of the job.

6 Claims, 11 Drawing Sheets

```
# # # # # # #
          │ │ │ │ │
          │ │ │ │ │ ----- minute (0 - 59)
          │ │ │ │ ------- hour (0 - 23)
          │ │ │ --------- day of month (1 - 31)
          │ │ ----------- month (1 - 12)
          │ ------------- day of week (0 - 6) (Sunday=0)
          *  *  *  *  *  command to be executed
```

Fig. 3
*(prior art)*

Scheduling Entry Format

| Field | Possible Value |
|---|---|
| Year | 2006 – infinity |
| Month | 0-11. 0 stands for January |
| Day of month | 1-31 |
| Day of week | 1-7 1 stands for Sunday, 2-for Monday, and so on |
| Hour | 0-23 |
| Minute | 0-59 |

*Fig. 7*

| Field | Value | Meaning |
|---|---|---|
| Year | 2007,2008 | Run in years 2007 and 2008 |
| Month | */3 | Run every third month of the year, counting from 0, which is months 0, 3, 6, 9, or January, April, July, and October. |
| Day of Month | * | The value of Day of Week is taken into consideration, because Day of Month is * while Day of Week is specified. |
| Day of Week | 6,7 | Run every Friday and Saturday |
| Hour | 8-10,12-14 | Run between 8 AM and 10 AM and then between 12 PM and 2 PM |
| Minute | */15,32 | Run every quarter of an hour and every 32 minutes past the hour within the ranges specified in the Hour field. |

*Fig. 8*

| Iteration | Execution Time |
|---|---|
| 1 | Fri Jan 05 08:00:00 GMT 2007 |
| 2 | Fri Jan 05 08:15:00 GMT 2007 |
| 3 | Fri Jan 05 08:30:00 GMT 2007 |
| 4 | Fri Jan 05 08:32:00 GMT 2007 |
| 5 | Fri Jan 05 08:45:00 GMT 2007 |
| 6 | Fri Jan 05 09:00:00 GMT 2007 |
| 7 | Fri Jan 05 09:15:00 GMT 2007 |
| 8 | Fri Jan 05 09:30:00 GMT 2007 |
| 9 | Fri Jan 05 09:32:00 GMT 2007 |
| 10 | Fri Jan 05 09:45:00 GMT 2007 |
| 11 | Fri Jan 05 10:00:00 GMT 2007 |
| 12 | Fri Jan 05 10:15:00 GMT 2007 |
| 13 | Fri Jan 05 10:30:00 GMT 2007 |
| 14 | Fri Jan 05 10:32:00 GMT 2007 |
| 15 | Fri Jan 05 10:45:00 GMT 2007 |
| 16 | Fri Jan 05 12:00:00 GMT 2007 |
| 17 | Fri Jan 05 12:15:00 GMT 2007 |
| 18 | Fri Jan 05 12:30:00 GMT 2007 |
| 19 | Fri Jan 05 12:32:00 GMT 2007 |
| 20 | Fri Jan 05 12:45:00 GMT 2007 |
| 21 | Fri Jan 05 13:00:00 GMT 2007 |
| 22 | Fri Jan 05 13:15:00 GMT 2007 |
| 23 | Fri Jan 05 13:30:00 GMT 2007 |
| 24 | Fri Jan 05 13:32:00 GMT 2007 |
| 25 | Fri Jan 05 13:45:00 GMT 2007 |
| 26 | Fri Jan 05 14:00:00 GMT 2007 |
| 27 | Fri Jan 05 14:15:00 GMT 2007 |
| 28 | Fri Jan 05 14:30:00 GMT 2007 |
| 29 | Fri Jan 05 14:32:00 GMT 2007 |
| 30 | Fri Jan 05 14:45:00 GMT 2007 |
| 31 | Sat Jan 06 08:00:00 GMT 2007 |
| 32 | Sat Jan 06 08:15:00 GMT 2007 |
| 33 | Sat Jan 06 08:30:00 GMT 2007 |
| 34 | Sat Jan 06 08:32:00 GMT 2007 |
| ... | ... |

*Fig. 9*

CRON TIME PROCESSING IMPLEMENTATION FOR SCHEDULING TASKS WITHIN A MULTI-TIERED ENTERPRISE NETWORK

BACKGROUND

1. Field of the Invention

This invention relates generally to the field of data processing systems. More particularly, the invention relates to a system and method for scheduling tasks within a multi-tiered enterprise network.

2. Description of the Related Art

Enterprise Computing Systems

Traditional client-server systems employed a two-tiered architecture such as that illustrated in FIG. 1a. Applications 102 executed on the client side 100 of the two-tiered architecture are comprised of a monolithic set of program code including a graphical user interface component, presentation logic, business logic and a network interface that enables the client 100 to communicate over a network 103 with one or more servers 101. A database 104 maintained on the server 101 provides non-volatile or "persistent" storage for the data accessed and/or processed by the application 102.

The "business logic" component of the application represents the core program code of the application, i.e., the rules governing the underlying business process (or other functionality) provided by the application. The "presentation logic" describes the specific manner in which the results of the business logic are formatted for display on the user interface. The "database" 104 includes data access logic used by the business logic to store and retrieve data.

The limitations of the two-tiered architecture illustrated in FIG. 1a become apparent when employed within a large enterprise. For example, installing and maintaining up-to-date client-side applications on a large number of different clients is a difficult task, even with the aid of automated administration tools. Moreover, a tight coupling of business logic, presentation logic and the user interface logic makes the client-side code very brittle. Changing the client-side user interface of such applications is extremely hard without breaking the business logic, and vice versa. This problem is aggravated by the fact that, in a dynamic enterprise environment, the business logic may be changed frequently in response to changing business rules. Accordingly, the two-tiered architecture is an inefficient solution for enterprise systems.

In response to limitations associated with the two-tiered client-server architecture, a multi-tiered architecture has been developed, as illustrated in FIG. 1b. In the multi-tiered system, the presentation logic 121, business logic 122 and database 123 are logically separated from the user interface 120 of the application. These layers are moved off of the client 125 to one or more dedicated servers on the network 103. For example, the presentation logic 121, the business logic 122, and the database 123 may each be maintained on separate servers, 126, 127 and 128, respectively.

This separation of logical components and the user interface provides a more flexible and scalable architecture compared to that provided by the two-tier model. For example, the separation ensures that all clients 125 share a single implementation of business logic 122. If business rules change, changing the current implementation of business logic 122 to a new version may not require updating any client-side program code. In addition, presentation logic 121 may be provided which generates code for a variety of different user interfaces 120, which may be standard browsers such as Internet Explorer® or Netscape Navigator®.

The multi-tiered architecture illustrated in FIG. 1b may be implemented using a variety of different application technologies at each of the layers of the multi-tier architecture, including those based on the Java 2 Enterprise Edition™ ("J2EE") standard, the Microsoft .NET standard and/or the Advanced Business Application Programming ("ABAP") standard developed by SAP AG. For example, as described below, in a J2EE environment, the business layer 122, which handles the core business logic of the application, is comprised of Enterprise Java Bean ("EJB") components with support for EJB containers. Within a J2EE environment, the presentation layer 121 is responsible for generating servlets and Java Server Pages ("JSP") interpretable by different types of browsers at the user interface layer 120.

J2EE Application Server Architecture

FIG. 2 illustrates a typical J2EE application server 200 in which the presentation layer is implemented by a "Web container" 211 and the business layer is implemented by an Enterprise Java Bean ("EJB") container 201. Containers are runtime environments which provide standard common services 219, 209 to runtime components. For example, the Java Naming and Directory Interface ("JNDI") is a service that provides application components with methods for performing standard naming and directory services. Containers also provide unified access to enterprise information systems 217 such as relational databases through the Java Database Connectivity ("JDBC") service, and legacy computer systems through the J2EE Connector Architecture ("JCA") service. In addition, containers provide a declarative mechanism for configuring application components at deployment time through the use of deployment descriptors.

As illustrated in FIG. 2, each layer of the J2EE architecture includes multiple containers. The Web container 211, for example, is itself comprised of a servlet container 215 for processing servlets and a Java Server Pages ("JSP") container 216 for processing Java server pages. The EJB container 201 includes three different containers for supporting three different types of enterprise Java beans: a session bean container 205 for session beans, a entity bean container 206 for entity beans, and a message driven bean container 207 for message driven beans. A more detailed description of J2EE containers and J2EE services can be found in RAGAE GHALY AND KRISHNA KOTHAPALLI, SAMS TEACH YOURSELF EJB IN 21 DAYS (2003) (see, e.g., pages 353-376).

Job Scheduling

Certain computer systems such as UNIX and LINUX systems employ a scheduling utility that allows tasks (also sometimes referred to as "jobs") to be automatically run in the background at periodic intervals. In UNIX, the utility, known as "crontab," reads a series of commands from a standard input and collects them into a file also called "crontab." The schedule specified by the crontab file is executed by a daemon, "crond," which runs continuously in the background and checks once a minute to determine if any of the scheduled jobs, referred to as "cron jobs," need to be executed. If so, it executes them.

Each line of a crontab file is formatted as a series of data fields, separated by spaces or tabs. Each field can have a single value or a series of values. The specific format employed within the crontab file is illustrated in FIG. 3. Specifically, the format includes one or more data values for minute, hour, day of month, month and day of week, followed by the command to be executed.

There are several ways in which multiple values may be specified in a field. A comma (',') operator specifies a list of values (e.g., "1, 3, 4, 7, 8"). The dash ('-') operator specifies a range of values (e.g., "1-6" which is equivalent to "1, 2, 3, 4, 5, 6"). The asterisk ('*') operator specifies all possible values for a field. For example, an asterisk in the hour time field would be equivalent to 'every hour'. The slash ('/') operator, supported by some systems, can be used to skip a given number of values. By way of example, "*/3" in the hour time field is equivalent to "0, 3, 6, 9, 12, 15, 18, 21"; "*" specifies every hour but the "/3" means that only the first, fourth, seventh, etc, values given by "*" are used.

SUMMARY

A computer implemented system and method are described for scheduling jobs. A method according to one embodiment of the invention includes the operations of: determining a first possible execution time of a job from a data object containing a job timing entry; determining if a specified base time is less than a first possible execution time of the job; if the specified base time is less than the first possible execution time, then subtracting the base time from the first possible execution time to determine the time until the next execution of the job; and if the specified base time is greater than the first possible execution time, then searching for a next execution time which is greater then the specified base time and subtracting the base time from the next execution time to determine the time until the next execution of the job.

BRIEF DESCRIPTION OF THE DRAWINGS

A better understanding of the present invention can be obtained from the following detailed description in conjunction with the following drawings, in which:

FIG. 3 illustrates a specific data format employed within a prior art crontab file.

FIG. 7 illustrates ranges of values for each of the parameter sets employed in one embodiment of the invention.

FIGS. 8-9 illustrate an example with a specific set of parameters.

DETAILED DESCRIPTION OF PREFERRED EMBODIMENTS

Described below is a system and method for scheduling tasks within a multi-tiered enterprise network. Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

One embodiment of the invention improves scheduling performance by calculating the remaining time to the next execution of entries within a scheduling file from a specified base time. Once the remaining time has been calculated, the job thread may be put to sleep for the calculated remaining time. By contrast, in current scheduling systems such as those described above, the cron file needs to be checked periodically (e.g., once a minute) to determine if any scheduled jobs need to be executed, thereby consuming processing resources.

Figure 1A:
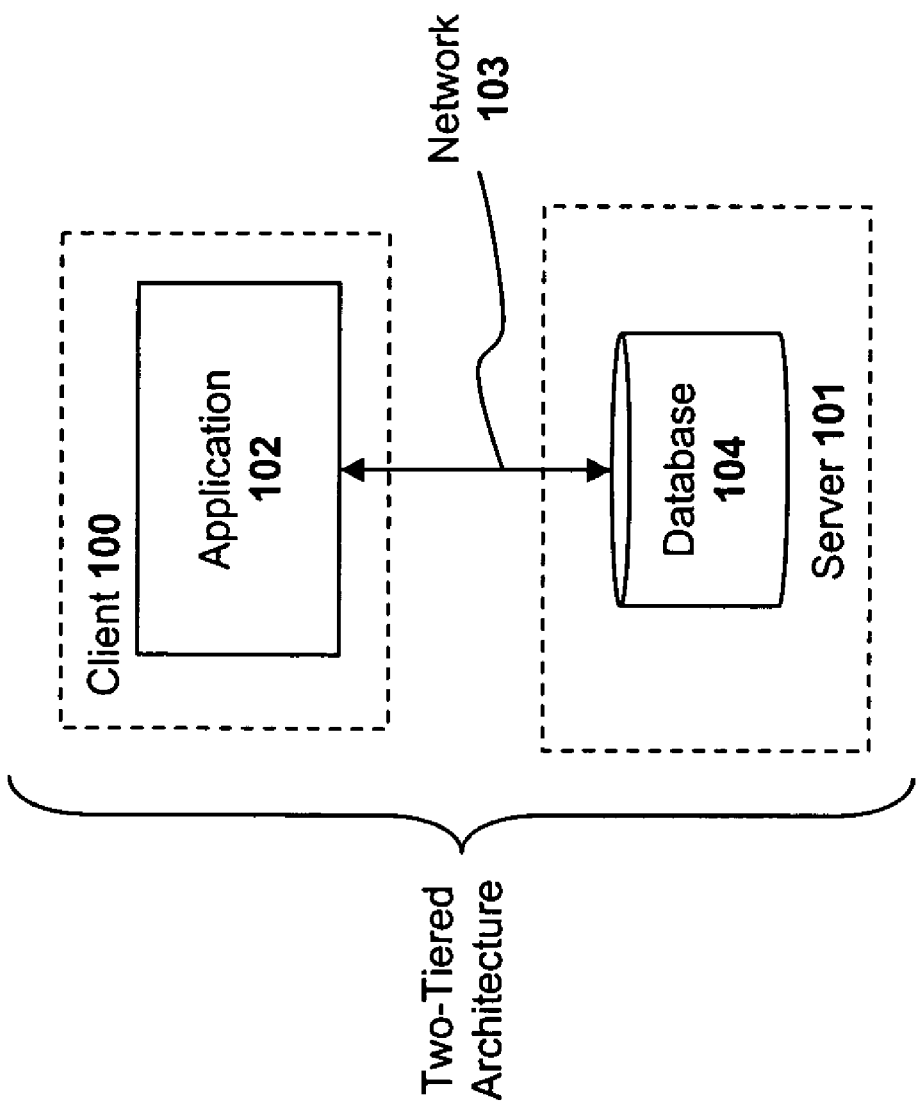
FIG. 1a illustrates a traditional two-tier client-server architecture.
Figure 1B:
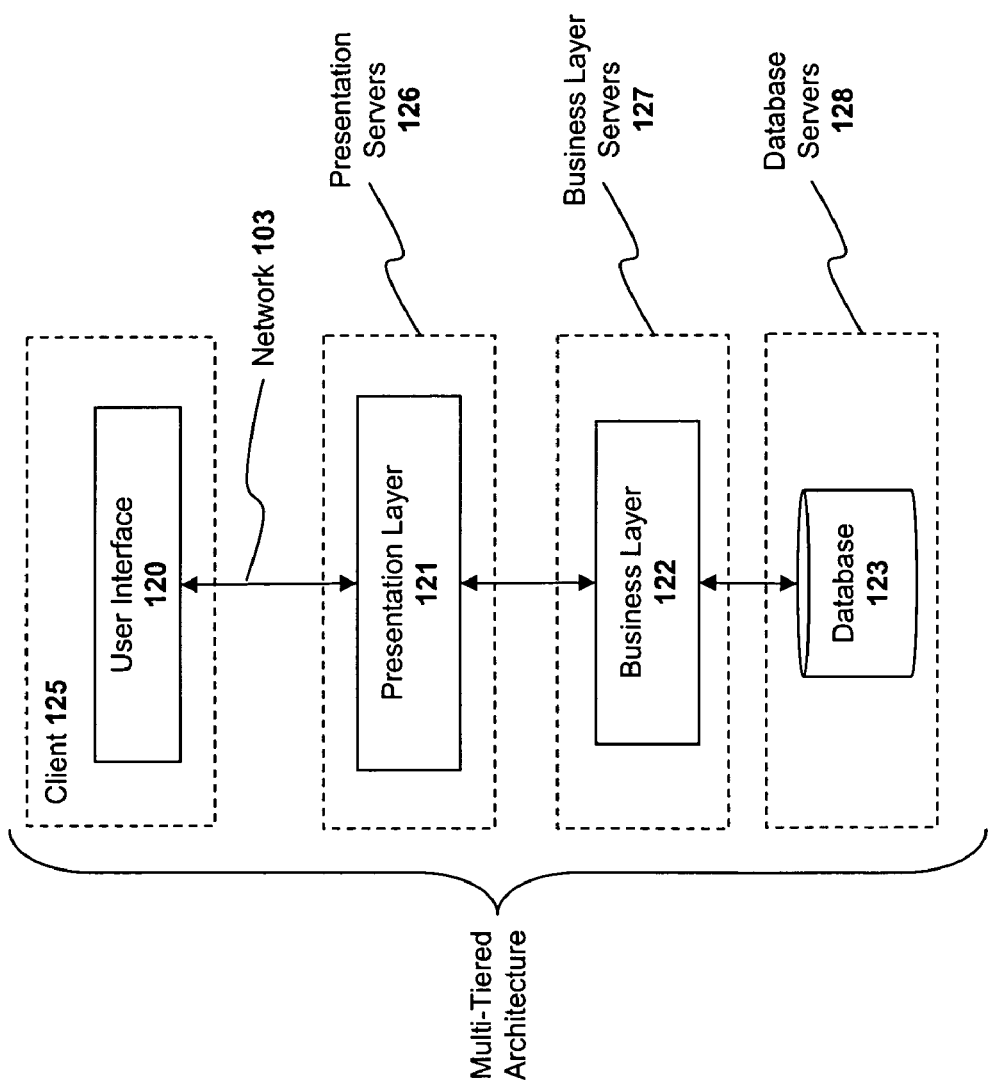
FIG. 1b illustrates a prior art multi-tier client-server architecture.
Figure 2:
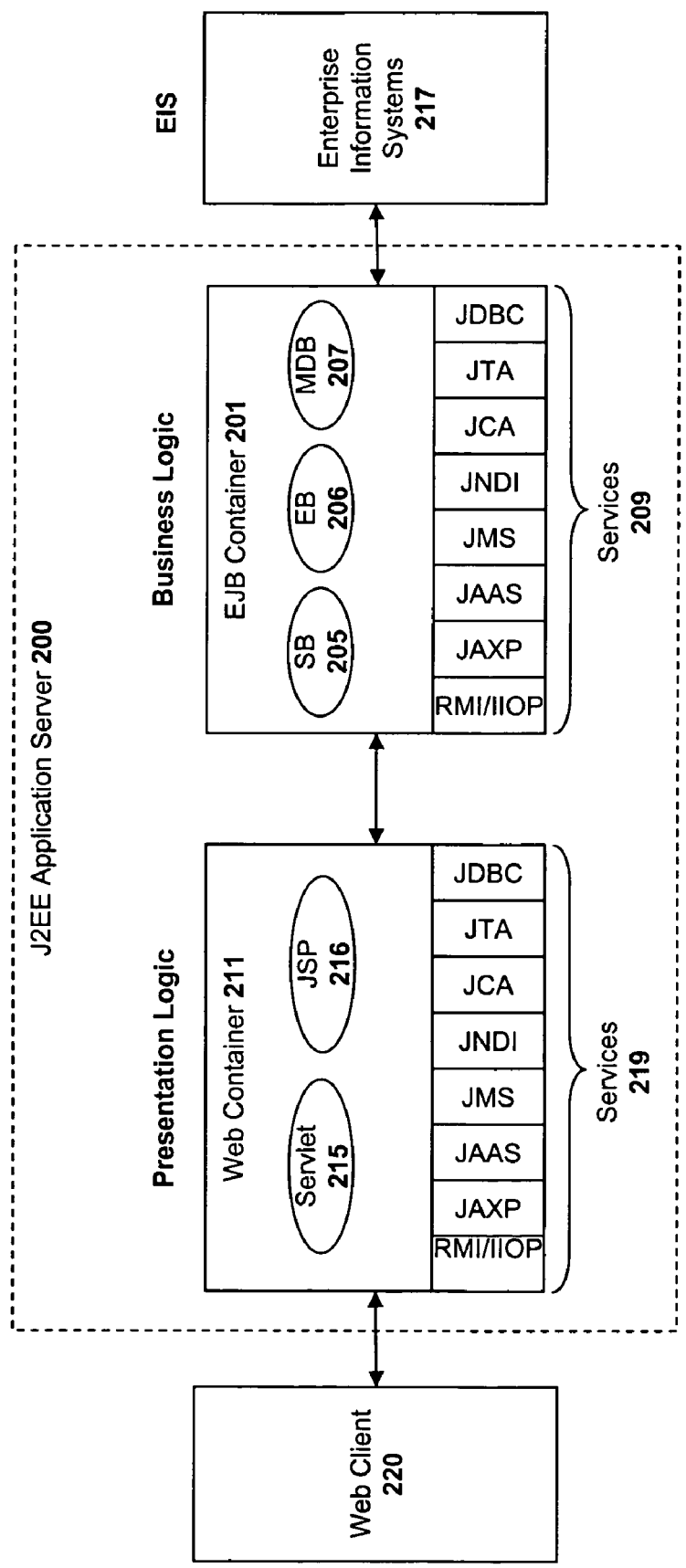
FIG. 2 illustrates a multi-tiered application server architecture according to the Java 2 Enterprise Edition ("J2EE") standard.
Figure 4:
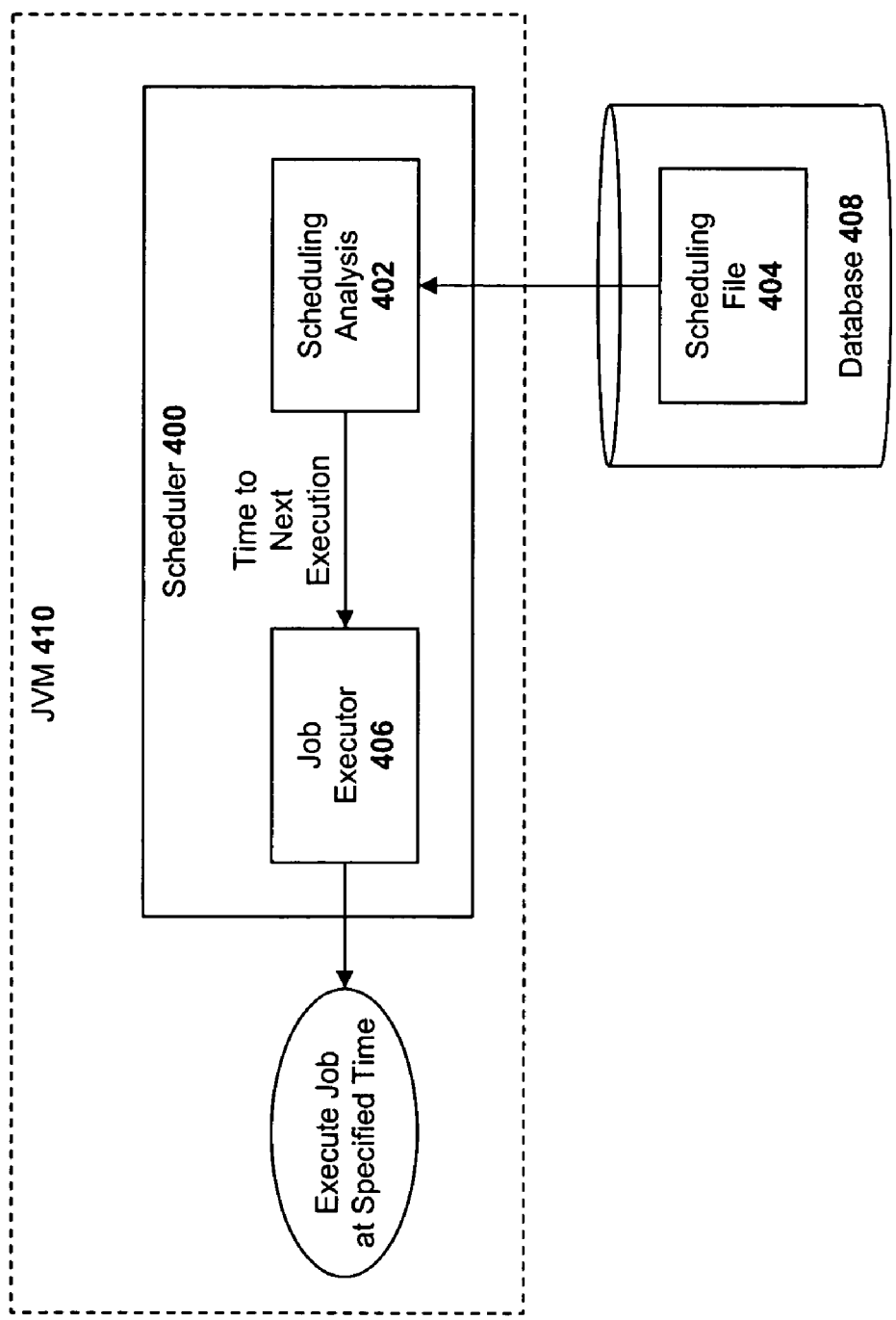
FIG. 4 illustrates a system architecture according to one embodiment of the invention.

One embodiment of the invention, illustrated in FIG. 4, includes a scheduler service 400 which implements the scheduling techniques described herein. In the illustrated embodiment, the scheduling service 400 is executed within a Java Virtual Machine (JVM) 410. However, the underlying principles of the invention are not limited to any particular execution environment.

The scheduler service 400 includes a scheduling analysis module 402 and a task executor module 406. The scheduling analysis module 402 parses and analyzes the entries within a scheduling file 404 to calculate the time remaining until the next execution of the entries. As indicated in FIG. 4, in one embodiment, the scheduling file 404 may be stored within database 408, although any other type of storage format may be used. For example, in an alternate implementation, the scheduling file 404 may be stored within a file system.

In operation, the scheduling analysis module 402 compares entries within the scheduling file to a specified base time to determine the time remaining for execution. In one embodiment, the base time is set to the current time within the time zone of the local computing system on which the scheduling analysis module 402 is executed. In an alternate implementation, the base time is set to the time in a different time zone.

Figure 5:
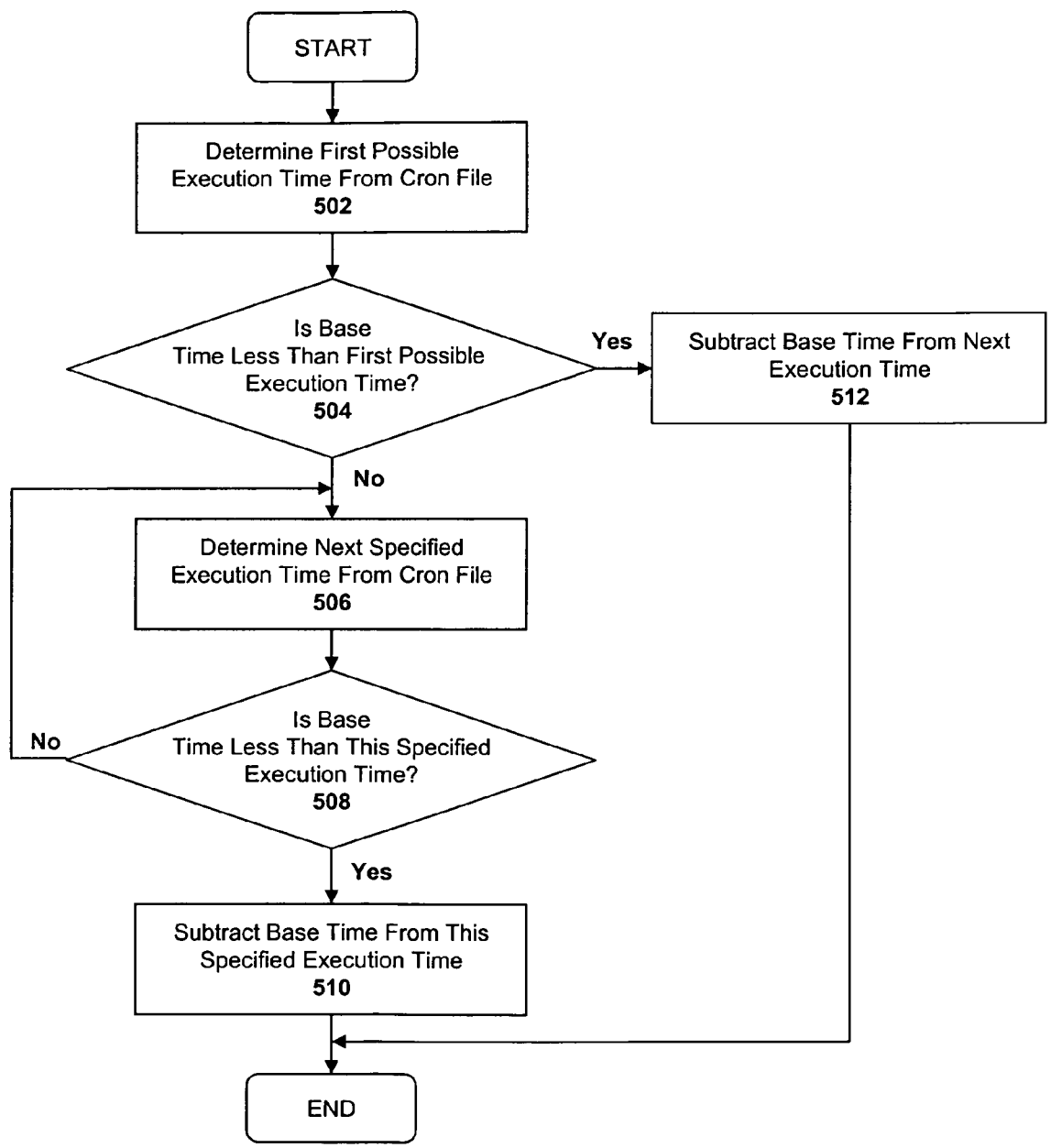
FIG. 5 illustrates a method according to one embodiment of the invention.
Figure 6:
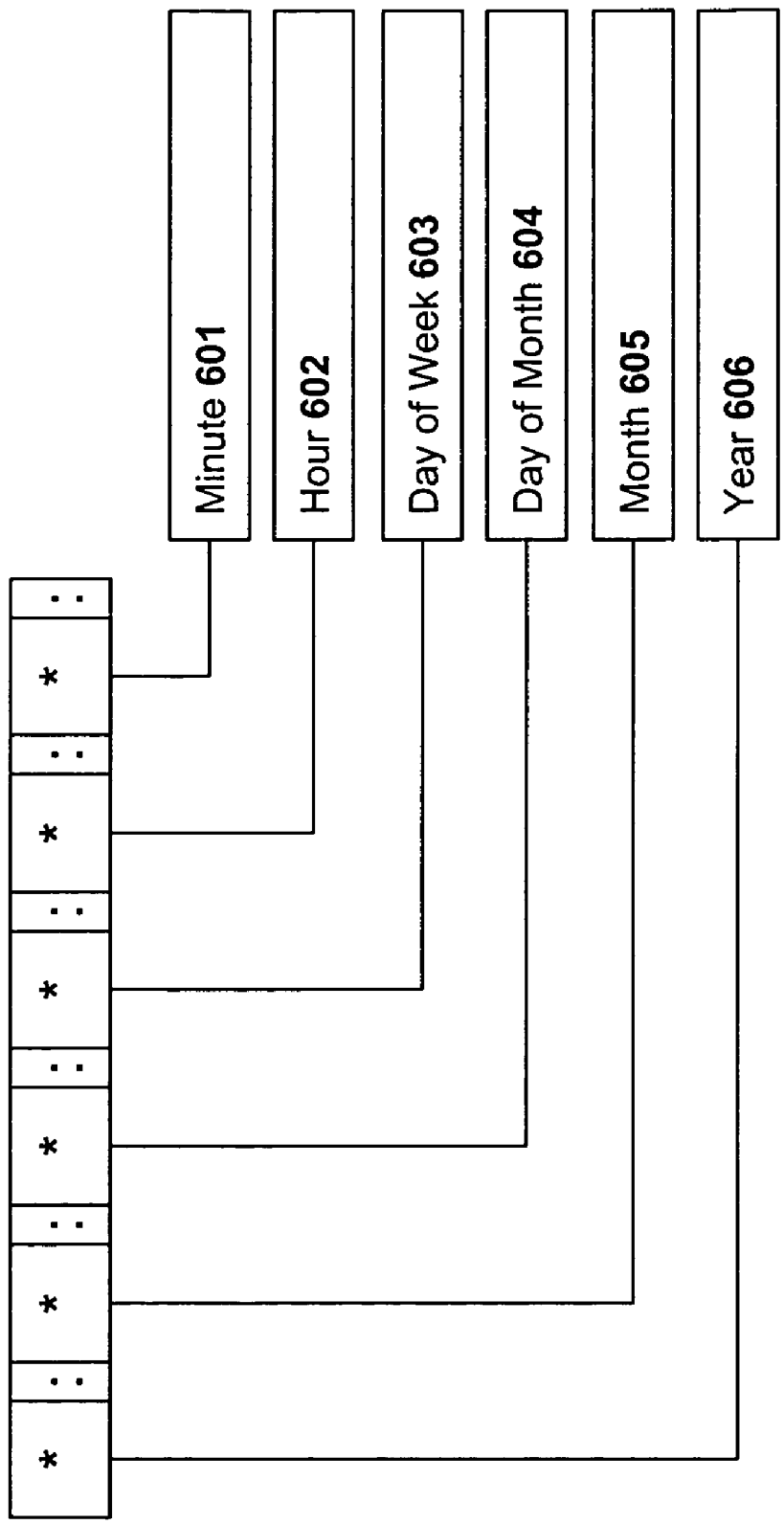
FIG. 6 illustrates a set of scheduling parameters employed in one embodiment of the invention.

FIG. 5 illustrates a method implemented by the scheduling analysis module according to one embodiment of the invention. At 502, the scheduling analysis module 402 determines the first possible execution time of an entry in the scheduling file. In one embodiment, the first execution time is determined based on the minimum possible values from a set of timing parameters. FIGS. 6-7 illustrate six parameters used in one embodiment of the invention to specify execution times: the year 606 in which the job is to be run; the month 605 in which the job is to be run; the day of month 604 in which the job is to be run; the day of week 603 in which the job is to be run; the hour 602 in which the job is to be run; and the minute 601 in which the job is to be run. As indicated in FIG. 6, in one embodiment, each of the parameter sets are separated by colons within the scheduling file. However, the specific format employed within the scheduling file is not relevant to the underlying principles of the invention. The possible values for each of the parameter sets are illustrated in FIG. 7.

For the purpose of illustration, several specific examples of parameter values specified within the scheduling file and associated meanings are illustrated in FIG. 8. In one embodiment, these values are specified within the scheduling file 404 according to the following format: CronEntry ce=new CronEntry ("2007,2008:*/3:*:6,7:8-10,12-14:*/15,32"). A portion of the resulting execution schedule is set forth in FIG. 9.

Returning to FIG. 5, at 504, if the scheduling analysis module 402 determines that the base time is less that the first possible execution time, then the first possible execution time is the next execution time. As such, at 512, the base time is subtracted from the next execution time to determine the remaining time to the next execution.

If the base time is greater than the first possible execution time, then at 506, the scheduling analysis module 402 identifies a next execution time from the scheduling file 404. If the base time is greater than this specified execution time, determined at 508, then the method repeats from 506. If the If the base time is less than this specified execution time, then at 510 the base time is subtracted from this specified execution time to determine the time until the next execution. Once the time to the next execution has been calculated, it is provided to a task executor module 406 which then sleeps for the specified amount of time. When the specified amount of time has ended, the task executor module 406 causes the specified task to be executed. Thus, in this embodiment the task executor module is a "sleep task"—i.e., a task which sleeps for a specified period of time, after which another specified task is executed.

In one embodiment, at step 506 described above, the next execution time is selected from a particular one of the parameter sets (e.g., minute, hour, day of week) based on the difference in time between the base time and the previously-selected execution time. For example, if the difference between a selected execution time and the base time is 1 hour and 30 minutes, then the next execution time is selected from the hour parameter set because the difference is greater than a minute but less than a day. Similarly, if the difference between a selected execution time and the base time is greater than a year, then the then the next execution time is selected from the year set. Stated more generally, if the difference between a selected execution time and the base time is greater than the standard time value of the parameters in a first parameter set (e.g., 1 minute for the minute parameter set) and less than the standard time value of the parameters in a second parameter set (e.g., one day for the day parameter set), then the scheduling analysis module selects from the parameter set between the first and second parameter sets (e.g., the hour parameter set in the example).

By way of a specific example, assume that an entry within the scheduling file 404 specifies executions at 10:00, 11:00 and 12:00, and the specified base time is at 11:30. In this case, the first execution within the scheduling file is at 10:00, which is earlier than the base time, so the process jumps to the next of the available executions. The next execution value is retrieved from the hour parameter set because the difference is bigger than minute and it is lower than a day. The next available hour is 11:00 but this is still 30 minutes earlier than the base time. As such, the next value is retrieved from the hour parameter set (for the same reason as before). The next value is 12:00 which means that the next execution is 30 minutes from the base time. Thus, the scheduling analysis module 402 commands the job executor module 406 to sleep and execute after 30 minutes.

Figure 10:
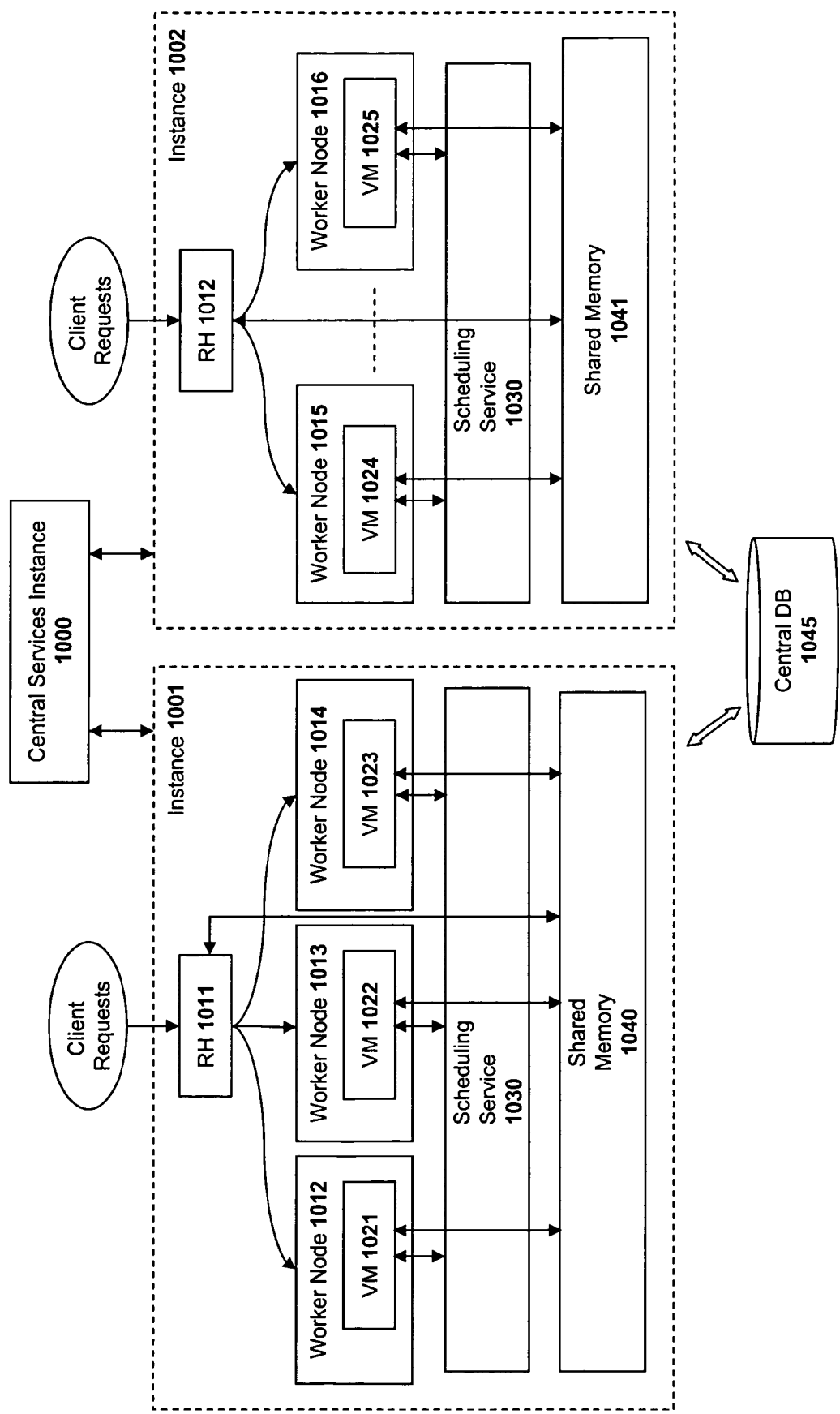
FIG. 10 illustrates a computer system architecture on which one embodiment of the invention is implemented.

A system architecture on which embodiments of the invention may be implemented is illustrated in FIG. 10. The architecture includes a plurality of application server "instances" 1001 and 1002. The application server instances 1001 and 1002 each include a group of worker nodes 1012-1014 and 1015-1016 (also sometimes referred to herein as "server nodes"), respectively, and a dispatcher 1011 and 1012, respectively. The application server instances 1001, 1002 communicate through a central services instance 1000 using message passing. In one embodiment, the central services instance 1000 includes a locking service and a messaging service (described below). The combination of all of the application server instances 1001 and 1002 and the central services instance 1000 is referred to herein as a "cluster." Although the following description will focus solely on instance 1001 for the purpose of explanation, the same principles apply to other instances within the cluster.

The worker/server nodes 1012-1014 within instance 1001 provide the business and presentation logic for the network applications supported by the system including, for example, the Web container 211 and the EJB container 201 functionality described herein. Each of the worker nodes 1012-1014 within a particular instance may be configured with a redundant set of programming logic and associated data, represented as virtual machines 1021-1023 in FIG. 10. In one embodiment, the dispatcher 1011 distributes service requests from clients to one or more of the worker nodes 1012-1014 based on the load on each of the servers. For example, in one embodiment, the dispatcher maintains separate queues for each of the worker nodes 1012-1014 in a shared memory 1040. The dispatcher 1011 fills the queues with client requests and the worker nodes 1012-1014 consume the requests from each of their respective queues. The client requests may be from external clients (e.g., browser requests) or from other components/objects within the instance 1001 or cluster.

In one embodiment, the worker nodes 1012-1014 may be Java 2 Enterprise Edition ("J2EE") worker nodes which support Enterprise Java Bean ("EJB") components and EJB containers (at the business layer) and Servlets and Java Server Pages ("JSP") (at the presentation layer). In this embodiment, the virtual machines 1021-1025 implement the J2EE standard (as well as the additional non-standard features described herein). It should be noted, however, that certain high-level features described herein may be implemented in the context of different software platforms including, by way of example, Microsoft .NET platforms and/or the Advanced Business Application Programming ("ABAP") platforms developed by SAP AG, the assignee of the present application.

As indicated in FIG. 10, a scheduling service 1030 such as the one described above may be executed across each of the instances 1001, 1002. In one embodiment, the scheduling service 1030 implements the various techniques described herein for scheduling tasks/jobs for execution by the virtual machines 1021-1025.

In one embodiment, communication and synchronization between each of the instances 1001, 1002 is enabled via the central services instance 1000. As mentioned above, the central services instance 1000 includes a messaging service and a locking service. The message service allows each of the servers within each of the instances to communicate with one another via a message passing protocol. For example, messages from one server may be broadcast to all other servers within the cluster via the messaging service (e.g., such as the cache configuration messages described below). Alternatively, messages may be addressed directly to specific servers within the cluster (i.e., rather than being broadcast to all servers). In one embodiment, the locking service disables access to (i.e., locks) certain specified portions of configuration data and/or program code stored within a central database 1045. The locking service locks data on behalf of various system components which need to synchronize access to specific types of data and program code. In one embodiment, the central services instance 1000 is the same central services instance as implemented within the Web Application Server version 6.3 and/or 6.4 developed by SAP AG. However, the underlying principles of the invention are not limited to any particular type of central services instance.

In addition, unlike prior systems, one embodiment of the invention shares objects across virtual machines 1021-1025. Specifically, in one embodiment, objects such as session objects which are identified as "shareable" are stored within a shared memory region 1040, 1041 and are made accessible to multiple virtual machines 1021-1025. Creating new object instances from scratch in response to client requests can be a costly process, consuming processing power and network bandwidth. As such, sharing objects between virtual machines as described herein improves the overall response time of the system and reduces server load.

In a shared memory implementation, a shared memory area 1040, 1041 or "heap" is used to store data objects that can be accessed by multiple virtual machines 1021-1025. The data objects in a shared memory heap should generally not have any pointers or references into any private heap (e.g., the private memory regions/heaps of the individual virtual machines). This is because if an object in the shared memory heap had a member variable with a reference to a private object in one particular virtual machine, that reference would be invalid for all the other virtual machines that use that shared object.

More formally, this restriction can be thought of as follows: For every shared object, the transitive closure of the objects referenced by the initial object should only contain shared objects at all times. Accordingly, in one implementation of the invention, objects are not put into the shared memory heap by themselves—rather, objects (such as the scheduling analysis module 402 and scheduling file 404 described above) are put into the shared memory heap in groups known as "shared closures." A shared closure is an initial object plus the transitive closure of all the objects referenced by the initial object.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, propagation media or other type of machine-readable media suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. For example, although many of the embodiments set forth above relate to a Java or J2EE implementation, the underlying principles of the invention may be implemented in virtually any enterprise networking environment. Moreover, although some of the embodiments set forth above are implemented within a shared memory environment, the underlying principles of the invention are equally applicable to a non-shared memory environment.

Accordingly, the scope and spirit of the invention should be judged in terms of the claims which follow.

What is claimed is:

1. A computer-implemented method for scheduling jobs comprising:

determining a first possible execution time at which a job is scheduled to be executed, the first possible execution time being determined from a job scheduling file containing a job timing entry, the job timing entry comprising a plurality of parameter sets to identify execution times for the job, each of the parameter sets including parameters for a unit of time associated with the parameter set;

determining whether a specified base time is less than the first possible execution time of the job;

subtracting the base time from the first possible execution time to determine a time until a next execution of the job based on the specified base time being less than the first possible execution time;

searching for a next execution time at which the job is scheduled to be executed which is greater than the specified base time and subtracting the base time from the next execution time to determine the time until the next execution of the job based on the specified base time being greater than the first possible execution time, the searching for the next execution time comprising choosing the next execution time from a parameter set having a unit of time greater than a unit of time for a first parameter set and less than a unit of time for a second parameter set based on a difference in time between the base time and a selected next execution time being greater than an amount equal to the unit of time for the first parameter set;

providing the time until the next execution of the job to a sleep task, the sleep task to sleep for the time until the next execution of the job; and after the sleep task sleeps for the time until the next execution of the job, executing the job.

2. The method as in claim 1, the unit of time associated with each one of the parameter sets being selected from a group consisting of a year, a month, a day of month, a day of week, an hour, and a minute, the unit of time for each of the parameter sets being different.

3. A computer system having a memory for storing program code and a processor for executing the program code to perform the operations of:

determining a first possible execution time at which a job is scheduled to be executed, the first possible execution time being determined from a job scheduling file containing a job timing entry, the job timing entry comprising a plurality of parameter sets to identify execution times for the job, each of the parameter sets including parameters for a unit of time associated with the parameter set;

determining whether a specified base time is less than the first possible execution time of the job;

subtracting the base time from the first possible execution time to determine a time until a next execution of the job based on the specified base time being less than the first possible execution time;

searching for a next execution time at which the job is scheduled to be executed which is greater than the specified base time and subtracting the base time from the next execution time to determine the time until the next execution of the job based on the specified base time being greater than the first possible execution time, the searching for the next execution time comprising choosing the next execution time from a parameter set having a unit of time greater than a unit of time for a first parameter set and less than a unit of time for a second parameter set based on a difference in time between the base time and a selected next execution time being greater than an amount equal to the unit of time for the first parameter set;

providing the time until the next execution of the job to asleep task, the sleep task to sleep for the time until the next execution of the job; and after the sleep task sleeps for the time until the next execution of the job, executing the job.

4. The computer system as in claim 3, the unit of time associated with each one of the parameter sets being selected from a group consisting of a year, a month, a day of month, a day of week, an hour, and a minute, the unit of time for each of the parameter sets being different.

5. A non-transitory machine-readable medium having program code stored thereon which, when executed by a machine, causes the machine to perform the operations of:

determining a first possible execution time at which a job is scheduled to be executed, the first possible execution time being determined from a job scheduling file containing a job timing entry, the job timing entry comprising a plurality of parameter sets to identify execution times for the job, each of the parameter sets including parameters for a unit of time associated with the parameter set;

determining whether a specified base time is less than the first possible execution time of the job;

subtracting the base time from the first possible execution time to determine a time until a next execution of the job based on the specified base time being less than the first possible execution time;

searching for a next execution time at which the job is scheduled to be executed which is greater than the specified base time and subtracting the base time from the next execution time to determine the time until the next execution of the job based on the specified base time being greater than the first possible execution time, the searching for the next execution time comprising choosing the next execution time from a parameter set having a unit of time greater than a unit of time for a first parameter set and less than a unit of time for a second parameter set based on a difference in time between the base time and a selected next execution time being greater than an amount equal to the unit of time for the first parameter set;

providing the time until the next execution of the job to a sleep task, the sleep task to sleep for the time until the next execution of the job; and after the sleep task sleeps for the time until the next execution of the job, executing the job.

6. The machine-readable medium as in claim 5, the unit of time associated with each one of the parameter sets being selected from a group consisting of a year, a month, a day of month, a day of week, an hour, and a minute, the unit of time for each of the parameter sets being different.

* * * * *